United States Patent [19]

Duerksen

[11] Patent Number: 4,717,420

[45] Date of Patent: Jan. 5, 1988

[54] METHOD FOR CONVERTING URANIUM OXIDES TO URANIUM METAL

[75] Inventor: Walter K. Duerksen, Norris, Tenn.

[73] Assignee: The United States of America as represented by the United States Department of Energy, Washington, D.C.

[21] Appl. No.: 6,841

[22] Filed: Jan. 27, 1987

[51] Int. Cl.$^4$ ............................................. C22B 60/02
[52] U.S. Cl. ................................................. 75/84.1 R
[58] Field of Search ..................................... 75/84.1 R

[56] References Cited

U.S. PATENT DOCUMENTS

| | | | |
|---|---|---|---|
| 2,782,117 | 2/1957 | Wilhelm et al. | 75/84.1 A |
| 3,025,156 | 3/1962 | Humbert et al. | 75/84.1 R |
| 3,099,555 | 7/1963 | Teitel | 75/84.1 R |
| 3,119,686 | 1/1964 | Teitel | 75/84.1 R |
| 4,067,953 | 1/1978 | Roux et al. | 423/20 X |

OTHER PUBLICATIONS

Holden, A. N., *Physical Metallurgy of Uranium*, Addison–Wesley Publishing Co., Mass. (1958), pp. 52–53.

*Primary Examiner*—Matthew A. Thexton
*Attorney, Agent, or Firm*—Earl L. Larcher; Stephen D. Hamel; Judson R. Hightower

[57] ABSTRACT

A process is described for converting scrap and waste uranium oxide to uranium metal. The uranium oxide is sequentially reduced with a suitable reducing agent to a mixture of uranium metal and oxide products. The uranium metal is then converted to uranium hydride and the uranium hydride-containing mixture is then cooled to a temperature less than $-100°$ C. in an inert liquid which renders the uranium hydride ferromagnetic. The uranium hydride is then magnetically separated from the cooled mixture. The separated uranium hydride is readily converted to uranium metal by heating in an inert atmosphere. This process is environmentally acceptable and eliminates the use of hydrogen fluoride as well as the explosive conditions encountered in the previously employed bomb-reduction processes utilized for converting uranium oxides to uranium metal.

4 Claims, No Drawings

METHOD FOR CONVERTING URANIUM OXIDES TO URANIUM METAL

This invention was made as a result of work under contract DE-AC05-84OR21400 between Martin Marietta Energy Systems, Inc., and the United States Department of Energy.

BACKGROUND OF INVENTION

The present invention relates generally to the conversion of uranium oxides to uranium metal, and more particularly to a method for economically converting uranium oxides to metal while eliminating the explosive and environmentally unsafe conditions associated with oxide reduction techniques heretofore utilized.

Scrap and waste uranium metal usually undergoes oxidation during the storage thereof. The conversion of such uranium oxides to uranium metal for use in various applications has been commonly achieved in a bomb-type reduction process in which the oxides are first hydrofluorinated to uranium tetrafluoride. A reducing agent such as metallic calcium, magnesium, or lithium, and various chemical igniters are loaded into a reaction vessel together with the uranium tetrafluoride and heated to the desired ignition point to convert the uranium tetrafluoride to uranium metal. The resulting uranium metal is in the form of a regulus which is separated from the calcium fluoride slag for use in the desired application. While this reduction reaction provides high purity uranium metal there are some shortcomings which detract from the overall process. For example, the reaction produces a uranium-containing by-product of fluorides from the reducing agents. Further, some crucible material is taken up in the reaction and must be processed with the fluorides through various dissolution and solvent extraction steps to recover any residual uranium remaining in the by-products. These uranium metal recovery steps are fairly complicated and expensive and also present serious environmental and industrial safety problems due to the required use of hydrogen fluoride and the potential explosive conditions associated with the process.

SUMMARY OF THE INVENTION

Accordingly, it is the primary objective or aim of the present invention to provide a method for efficiently and economically converting various forms of uranium oxides as commonly found in scrap and waste storage areas into high purity uranium metal in a safe, environmentally acceptable manner. Generally, the method for converting uranium oxide to uranium metal in accordance with the present invention comprises the steps of heating uranium oxide in the presence of a reducing agent to a temperature sufficient to reduce the uranium oxide to uranium metal and thereby forming a heterogeneous mixture of a uranium metal product and oxide by-products. This mixture is then heated in a hydrogen atmosphere at a temperature sufficient to convert the uranium metal in the mixture to uranium hydride. The uranium hydride-containing mixture is then cooled to a temperature sufficient to produce a ferromagnetic transition in the uranium hydride. The cooled uranium hydride is then magnetically separated from the mixture. The separated uranium hydride may thereafter be heated in an inert atmosphere to a temperature sufficient to convert the uranium hydride to uranium metal.

A preferred method of the invention has been chosen for the purpose of description and is not intended to be exhaustive or to limit the invention to the precise method steps disclosed. The method steps described are chosen in order to best explain the method and the principals of the invention and their application in practical use to thereby enable others skilled in the art to best utilize the invention in various embodiments and modifications as are best adapted to the particular use contemplated.

DETAILED DESCRIPTION OF THE INVENTION

As generally described above, the present invention is directed to a method for converting uranium oxides to metal. The various forms of uranium oxides commonly found in uranium waste and storage facilities include $UO_2$, $U_3O_8$, and $UO_3$.

The invention is practiced by forming a heterogeneous mixture of particulate uranium oxide with a stoichiometric excess of a reducing agent selected from known reducing agents such as calcium, magnesium, lithium, and blends or alloys of these metals. The mixture is heated in a suitable refractory lined reactor in an atmosphere of argon or other inert gas to a temperature in the range of about 1000°–1400° C. to initiate the reduction reaction between the reducing agent and the uranium oxide to provide a product of uranium metal and oxide by-products. The uranium oxides utilized in this process are preferably in a particle size range of about 10 $\mu$m to 50 $\mu$m. The reducing agents, calcium, magnesium, lithium, and alloys thereof, each have well known reducing temperatures in the aforementioned temperature range. The reducing agent or combination of reducing agents mixed with the uranium oxide are preferably in a stoichiometric excess of about 5 to 40 percent for assuring complete reduction of the uranium metal.

After reducing the uranium oxide to metal, the mixture of the uranium metal product and the oxide by-products are placed in an evacuation chamber and the chamber is evacuated. A hydrogen atmosphere is then provided within the chamber and the mixture is heated in the hydrogen atmosphere to a temperature in a range of about 150°–200° C. for converting the uranium metal to uranium hydride. Conversion of the metal to the hydride has the beneficial effect of changing the physical state of the product from bulky sintered chunks to a fine powder. The hydrogen employed in the evacuation chamber is maintained at a partial pressure in the range of about 200 to 700 torr. during the hydriding step.

At the completion of the hydriding reaction, which normally takes a duration of about 5 to 10 minutes, the uranium hydride is still heterogeneously mixed with the oxide by-product. This mixture is then placed in a container formed of pyrex glass and cooled in an inert atmosphere to a temperature of less than about −100° C. for providing a ferromagnetic transition in the uranium hydride. Epsilon, or beta uranium hydride, upon cooling to less than about −100° C. results in the ferromagnetic transition associated with the delta structure of the uranium. The cooling of the uranium hydride and the mixture to a temperature less than about −100° C., preferably in a range of about −180° to −200° C., may be readily accomplished by emersing the mixture into a suitable volume of liquid argon or helium. While the mixture is at this super cold temperature of less than about −100° C., the ferromagnetic uranium hydride may be readily separated from the oxide by-product by magnetic separation. The separation can be provided in several ways. The material can be contacted with a magnet while in a liquid argon slurry, the powder and magnet can be both contained in an externally cooled chamber, or the magnetic field can be applied through the walls of the containment vessel. The uranium hydride removed from the bath by the magnetic separation may be then readily converted to uranium metal by heating the hydride in a pumped chamber to a temperature above 300° C. The resulting finely divided uranium metal powder may be readily consolidated into an appropriate shape by melting the uranium metal powder in a suitable crucible in an inert atmosphere. Impurities such as residual oxides form a separate phase that can be removed by acid pickling or abrasion.

In order to provide a better understanding of the present invention, an example relating to a typical conversion of uranium oxide to uranium metal in accordance with the present invention is set forth below.

EXAMPLE

Fifty-four grams of uranium dioxide of an average particle size of 25 mm was loaded into a 125 ml cylindrical alumina crucible. To this uranium dioxide was added a previously homogenized mixture of reducing agents provided by 3.6 grams of magnesium metal and 16.4 grams of calcium metal which provided the reducing agent with a stoichiometric excess of 40%. The mixture of the uranium dioxide and the reducing agent was then heated in the crucible under an inert atmosphere of argon to a temperature of 550° C. to initiate the reaction. The uranium dioxide-reducing agent mixture was then heated to a temperature of 1000° C. for a duration of six hours to effect the completion of the reduction of the uranium dioxide to uranium metal. This reduction resulted in a heterogeneous, tightly bonded mass of mixed uranium metal and oxides of the reducing agents. Analysis of the reaction product by X-ray diffraction showed a major pattern for α-uranium, and a weak minor pattern for CaO. This mass of uranium metal and oxide by-products was cooled to room temperature and transferred to a vacuum chamber which was evacuated and then heated to a temperature of 175° C. Gaseous hydrogen in an amount suitable to maintain a partial pressure of slightly less than atmospheric pressure was then admitted in a continuous manner into the vacuum chamber for converting the uranium metal to uranium hydride. During this conversion, the agglomerates of the uranium metal and the oxide by-products rapidly collapsed and the uranium hydride separated as fine powder from the oxide by-products. This conversion required a duration of about ten minutes for the quantity of reactants utilized. Analysis of the product by X-ray diffraction showed a major pattern for $UH_3$, and a weak minor pattern for CaO. After completion of the conversion, the mixture of uranium hydride particulates and oxide by-products was cooled and placed in a suitable containment vessel and covered with liquid argon for cooling the mixture to a temperature of less than −100° C. The resulting ferromagnetic uranium hydride was then pulled from the liquid argon bath with a permanent magnet leaving the oxides of the reducing agents and other non-magnetic materials in the vessel. The recovered uranium hydride powder was then converted to uranium metal by heating to a temperature of 350° C. in a pumped vacuum chamber until the background pressure was less than 1 torr. This uranium metal powder was then melted in a suitable crucible in an inert atmosphere at a temperature slightly above the melting point of uranium.

The method of the present invention effectively converts the uranium oxide found in waste and storage facilities to high purity uranium metal in a highly efficient manner while eliminating the environmental hazards heretofore encountered in the previous conversion processes as noted above. For example, hydrogen fluoride is not required in the process. Also, the explosive conditions encountered during the hydrofluorination and hydrogen reduction steps heretofore encountered have been eliminated from the subject process. Another advantage provided by the present invention is that the process may be readily adapted for use in batch or continuous type operations.

I claim:

1. A method for converting uranium oxide to uranium metal comprising the steps of heating uranium oxide in the presence of a reducing agent to a temperature sufficient to reduce the uranium oxide to uranium metal and form a heterogeneous mixture of a uranium metal product and oxide by-products, heating the mixture in a hydrogen atmosphere at a temperature sufficient to convert uranium metal in the mixture to uranium hydride, cooling the resulting uranium hydride-containing mixture to a temperature sufficient to produce a ferromagnetic transition in the uranium hydride, magnetically separating the cooled uranium hydride from the mixture, and thereafter heating the separated uranium hydride in an inert atmosphere to a temperature sufficient to convert the uranium hydride to uranium metal.

2. The method for converting uranium oxide to uranium metal as claimed in claim 1, wherein the uranium oxide is in a particle size range of about 10 to 50 μm, wherein the reducing agent is calcium, magnesium, lithium, or a mixture of two or more thereof, wherein the reducing agent is in a stoichiometric excess of about 5 to 40 percent, and wherein the heating of the uranium oxide in the presence of the reducing agent is in an inert atmosphere at a temperature in the range of about 1000°–1400° C.

3. The method for converting uranium oxide to uranium metal as claimed in claim 1, wherein said heterogeneous mixture is heated in the hydrogen atmosphere at a temperature in the range of 50° to 220° C.

4. The method for converting uranium oxide to uranium metal as claimed in claim 3, wherein the uranium hydride-containing mixture is cooled in an inert liquid selected from argon or helium to a temperature less than −100° C. to provide the ferromagnetic transition in the uranium hydride, and wherein the step of separating the uranium hydride from the mixture cooled in said inert liquid is provided while the uranium hydride is at said temperature of less than about −100° C.

* * * * *